US006814366B2

(12) United States Patent  
McCoy et al.

(10) Patent No.: US 6,814,366 B2
(45) Date of Patent: Nov. 9, 2004

(54) TRAILER HITCH ASSEMBLY WITH ACCESSORY PORTS

(75) Inventors: Richard W. McCoy, Granger, IN (US); Thomas W. Lindenman, South Bend, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

(21) Appl. No.: 10/182,096

(22) PCT Filed: Mar. 21, 2001

(86) PCT No.: PCT/US01/08951

§ 371 (c)(1),
(2), (4) Date: Jul. 23, 2002

(87) PCT Pub. No.: WO01/74610

PCT Pub. Date: Oct. 11, 2001

(65) Prior Publication Data

US 2003/0011169 A1 Jan. 16, 2003

Related U.S. Application Data

(60) Provisional application No. 60/194,502, filed on Apr. 3, 2000.

(51) Int. Cl.⁷ .............................................. B60D 13/00
(52) U.S. Cl. .......................... 280/495; 280/500; 280/504
(58) Field of Search .............................. 280/491.5, 495, 280/500, 504; 224/484–489, 518–521

(56) References Cited

U.S. PATENT DOCUMENTS

| 3,768,837 | A | | 10/1973 | Reese .......................... 280/495 |
| 4,915,276 | A | | 4/1990 | Devito .................... 224/42.43 |
| 5,330,084 | A | * | 7/1994 | Peters ......................... 224/506 |
| 5,476,279 | A | | 12/1995 | Klemetsen ............... 280/415.1 |
| 5,620,198 | A | | 4/1997 | Borchers .................... 280/507 |
| 6,125,945 | A | | 10/2000 | Skaggs et al. .............. 172/439 |
| D433,357 | S | | 11/2000 | McCoy et al. ............. D12/162 |
| 6,145,865 | A | | 11/2000 | Cannara et al. ............. 280/507 |
| 6,149,181 | A | | 11/2000 | Biederman ............... 280/291.1 |
| D445,738 | S | | 7/2001 | Lindenman et al. ........ D12/162 |
| 6,428,031 | B1 | * | 8/2002 | McCoy et al. .............. 280/495 |
| 6,435,801 | B2 | * | 8/2002 | Talbott ........................ 414/462 |

* cited by examiner

Primary Examiner—Lesley D. Morris
Assistant Examiner—L. Lum
(74) Attorney, Agent, or Firm—King & Schickli, PLLC

(57) ABSTRACT

A trailer hitch assembly includes a frame member and hitch receiver box, a pair of mounting brackets and a pair of accessory ports carried on the frame member inboard of the mounting brackets. The accessory ports each project rearwardly from the frame member a distance D and include a circular opening for receiving a recreational and/or utilitarian accessory. The receiver box has a first longitudinal axis extending in a first plane A. The accessory ports are parallel and have a second longitudinal axis extending in a second plane B where the planes A and B define an included angle of approximately 10–30°.

5 Claims, 5 Drawing Sheets

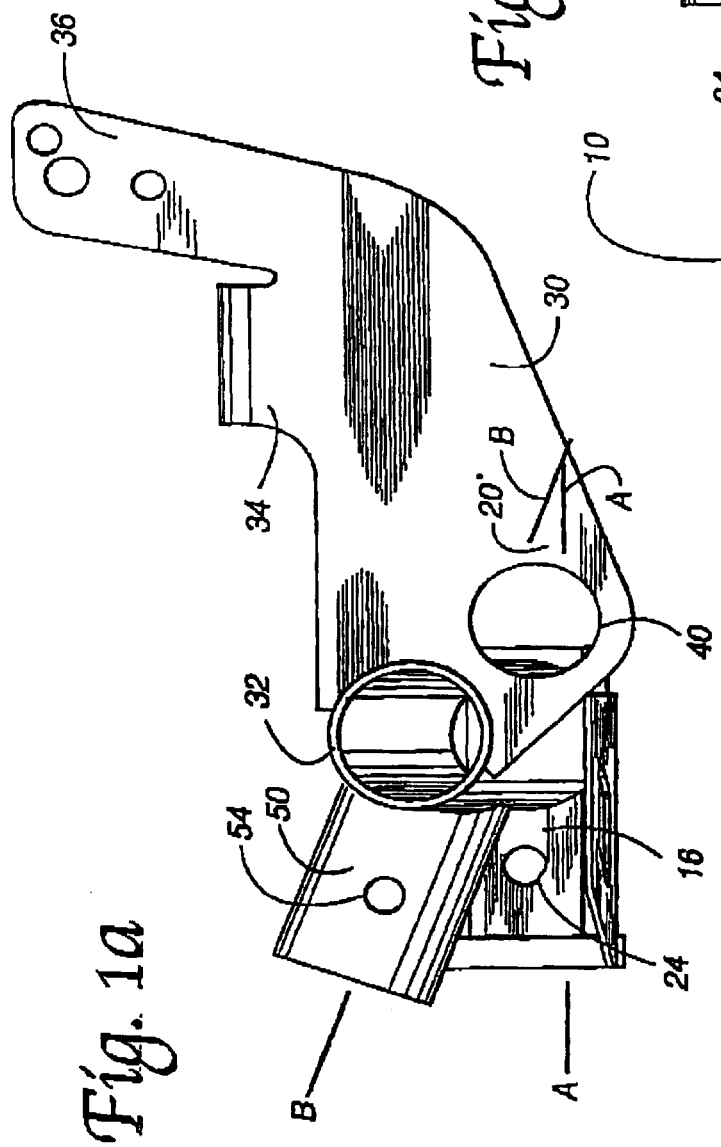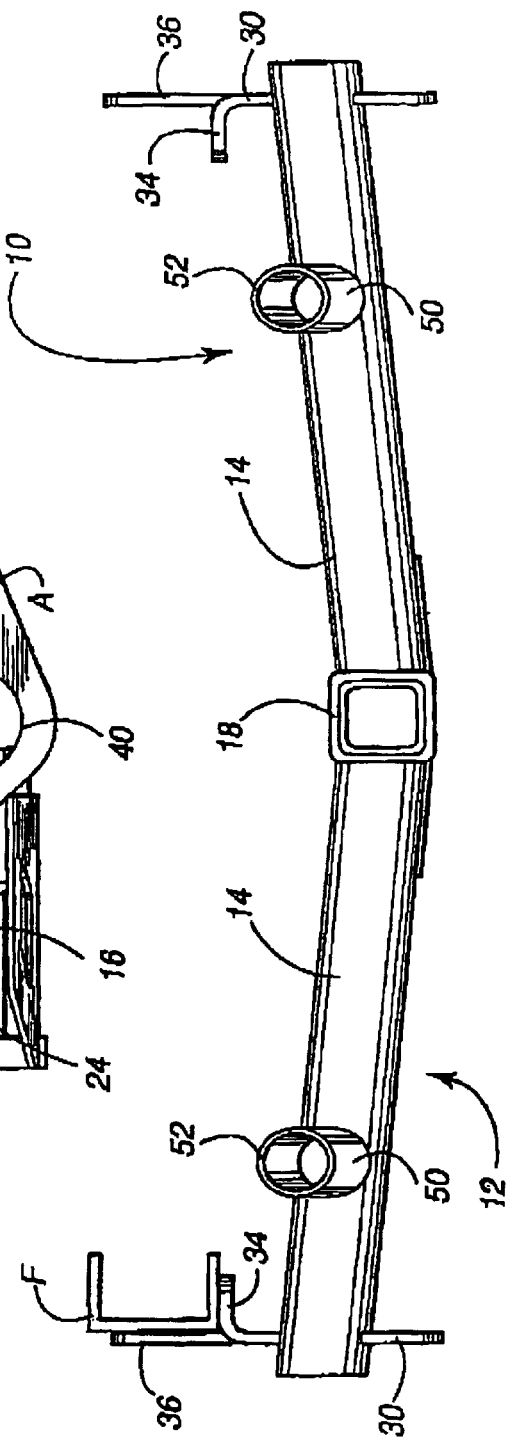

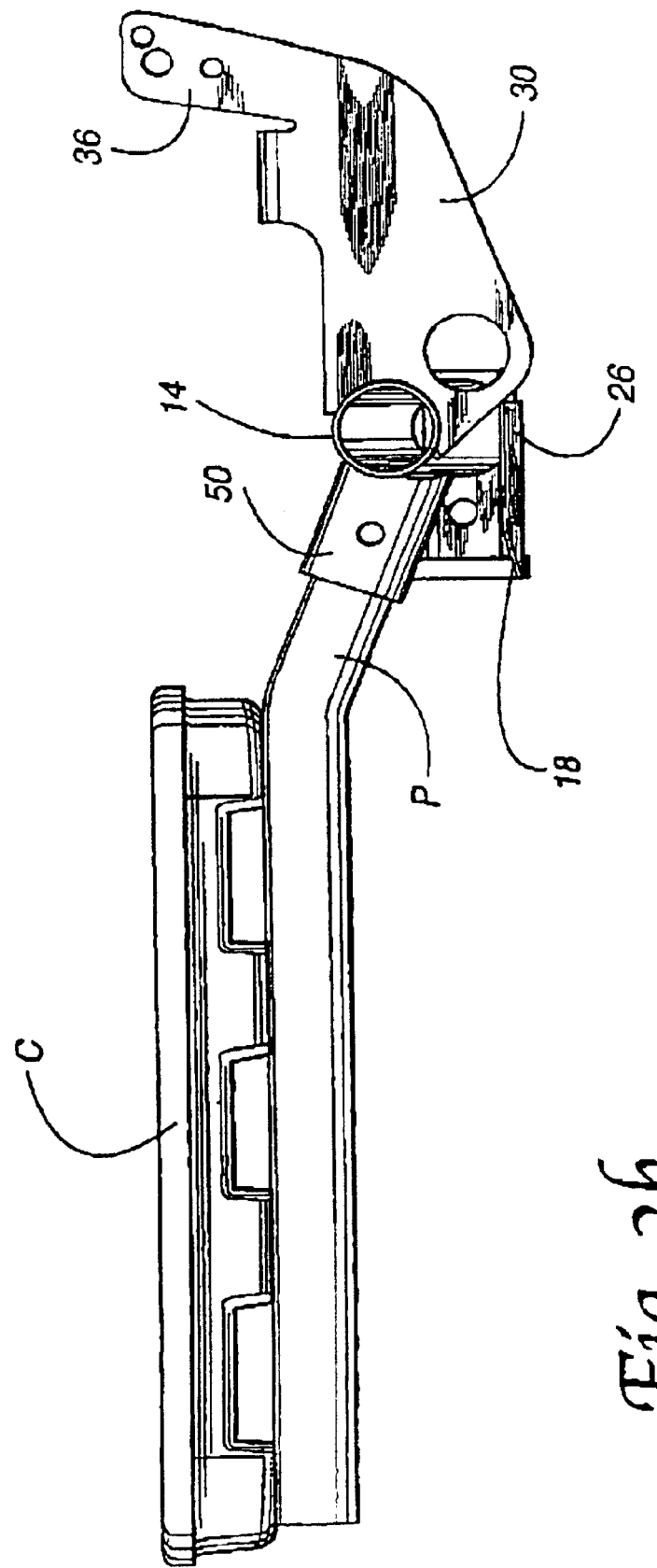

# TRAILER HITCH ASSEMBLY WITH ACCESSORY PORTS

This patent application is a National Stage of International Application serial no. PCT/US01/08951 filed on Mar. 21, 2001 which claims the benefit of U.S. Provisional Patent Application Ser, No. 60/194,502 filed on Apr. 3, 2000.

TECHNICAL FIELD

The present invention relates generally to trailer hitch assemblies and, more particularly, to a trailer hitch assembly incorporating at least one and more preferably two accessory ports for receiving and holding any number of recreational and utilitarian accessories such as a bike rack, ski rack, cargo carrier or the like.

BACKGROUND OF THE INVENTION

It has long been known to construct trailer hitch assemblies that are mounted to vehicles in order to allow the towing of trailers or the like. In recent years, such hitch assemblies have been designed to include a receiver box having a rearwardly directed opening or cavity for receipt of a hitch or draw bar that carries a hitch ball or other means allowing connection to a trailer. Examples of such a structure include U.S. Pat. No. 3,768,837 to Reese and U.S. Pat. No. 5,620,198 to Borchers, both owned by Reese Products, Inc., the assignee of the present invention.

While a single receiver box is particularly well adapted for receiving and holding a hitch bar and cooperating ball for towing a trailer, it is not as effective for mounting various popular accessories such as bike racks, ski racks, snow board racks, folding tables, work benches and cargo carriers. This is because a single point of connection does not provide the desired stability to the accessory. This may only generally be achieved by means of spaced multipoint connection.

Toward this end, multipoint trailer hitch accessory mounting arrangements have been previously developed. An example of one such approach is disclosed in U.S. Pat. No. 4,915,276 to Devito. This patent discloses a trailer hitch assembly including a basic frame comprising a cross member that carries a receiver box and a pair of mounting brackets for securing to a vehicle. The apparatus also includes a pair of spaced accessory mounting ports. The accessory mounting ports are each carried on a bracket that plugs into the end of the cross member.

While the apparatus disclosed in the Devito patent provides a spaced two point connection for stably supporting the illustrated article carrier, the apparatus is not without its drawbacks. It should be recognized that the brackets and accessory mounting ports are outboard the mounting brackets that secure the assembly to the frame of the vehicle. Such an arrangement prevents the application of this apparatus to many vehicles as existing rear wraparound quarter panels and exhaust systems on those vehicles interfere with and prevent the securing of the brackets that carry the accessory mounting ports into the ends of the cross member.

Further, even when installation of the Devito apparatus is possible, it is not particularly user friendly. The ends of the accessory mounting ports extend parallel to the ground under the bumper of the vehicle. In such a position, it is difficult to visually align and insert the mounting posts of an accessory in the two widely spaced mounting ports.

A need is, therefore, identified for an improved multipoint accessory mounting system.

SUMMARY OF THE INVENTION

The present invention provides a trailer hitch assembly incorporating at least one accessory port for receiving and holding a recreational and utilitarian accessory such as a bike rack, ski rack, cargo carrier or the like. The trailer hitch assembly provides reliable, yet relatively inexpensive construction incorporating a pair of accessory ports adapted to provide two point connection of an accessory to the towing vehicle. The pair of accessory ports are advantageously oriented so as to be easily engaged with a recreational and utilitarian accessory for convenient use.

Advantages and other novel features of the invention will be set forth in part in the description that follows and in part will become apparent to those skilled in the art upon examination of the following or may be learned with the practice of the invention. The advantages of the invention may be realized and obtained by means of the instrumentalities and combinations particularly pointed out in the appended claims.

To achieve the foregoing and in accordance with the purposes of the present invention as described herein, an improved trailer hitch assembly is provided. The trailer hitch assembly includes a frame member, a mounting bracket carried adjacent each end of the frame member for securing the frame member to the vehicle, a hitch receiver box carried on the frame member and at least one accessory port for receiving and holding a recreational and utilitarian accessory. Preferably, a pair of accessory ports are provided with one port carried on the frame member between each of the mounting brackets and the hitch receiver box: that is inboard of the mounting brackets through which the apparatus is secured to the frame of the vehicle to which it is mounted. Each of the accessory ports projects rearwardly from the frame member a distance D and includes a circular opening for receiving and holding a recreational and utilitarian accessory. Such a recreational and utilitarian accessory may include but is not limited to a bike rack, a ski rack or a cargo carrier.

More specifically describing the invention, the hitch receiver box has a longitudinal axis extending in a first plane and each accessory port has a second longitudinal axis extending in a second plane B, the planes A and B defining an included angle of approximately 10–30° and typically about 20°. As will be described in greater detail below, the relative orientation of the accessory ports with respect to the frame member, the hitch receiver box and the towing vehicle to which the assembly is mounted insures ease of accessory alignment and mounting for the benefit and satisfaction of the user.

Still other aspects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1a is a side elevational view of the trailer hitch assembly of FIG. 1,

FIG. 1b is a rear elevational view of the trailer hitch assembly of FIGS. 1 and 1a;

FIGS. 2a and 2b are respective perspective and side elevational views showing the connection of a cargo/carrier platform in the accessory ports of the trailer hitch assembly.

Reference will now be made in detail to the present preferred embodiments of the invention, an example of which is illustrated in the accompanying drawing.

DETAILED DESCRIPTION OF THE INVENTION

Figure 1:
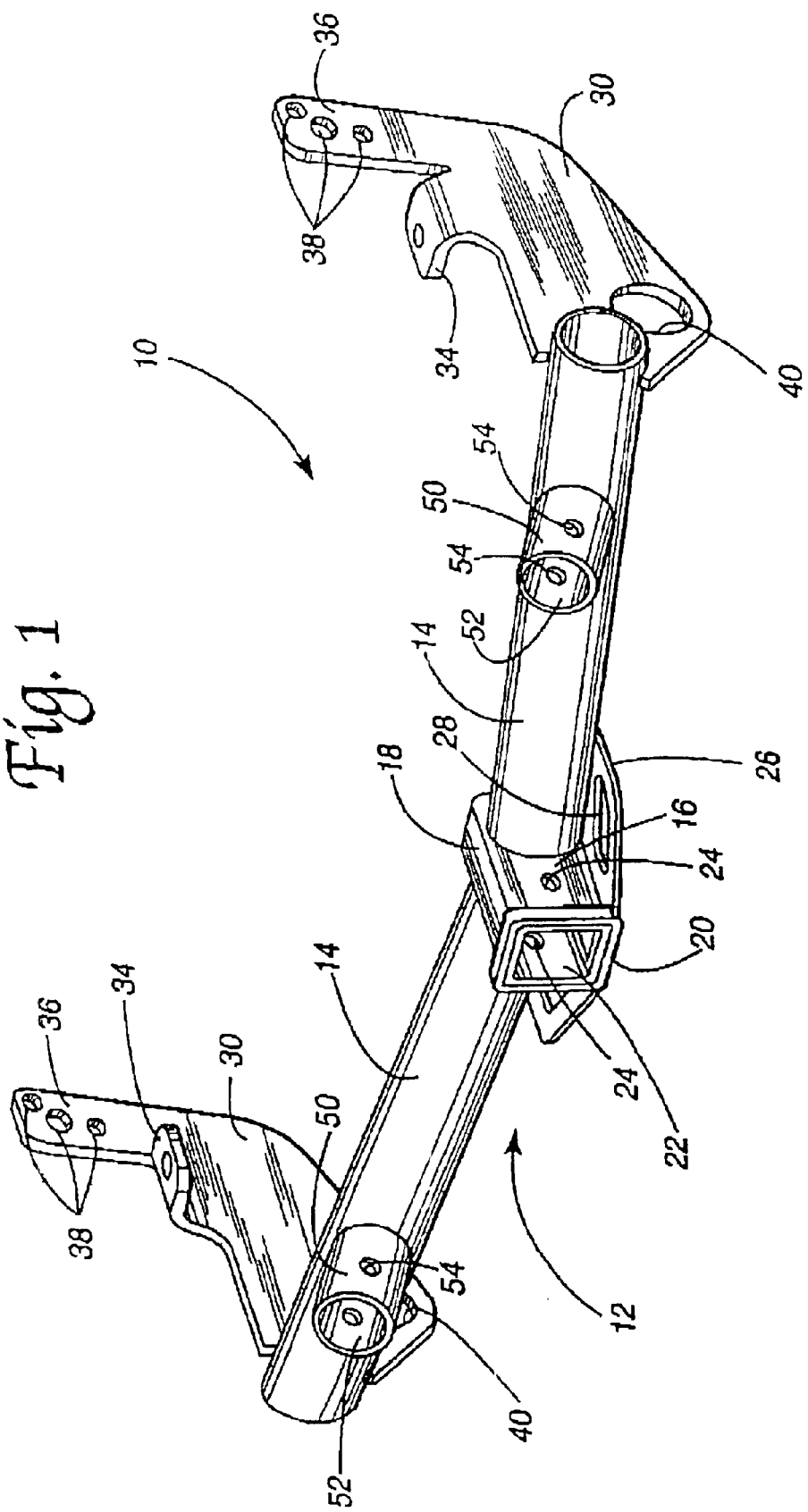
FIG. 1 is a perspective view of the trailer hitch assembly of the present invention.

Reference is now made to FIGS. 1, 1a and 1b showing a trailer hitch assembly 10 of the present invention. The trailer hitch assembly 10 includes a frame member or cross member 12 preferably formed from a pair of tubular steel sections 14 welded to the side wall 16 of a centrally located receiver box 18 so as to project outwardly in opposing directions. The tubular steel sections 14 may be formed with a round cross section as shown in the drawing figures, an elliptical cross section, a square cross section or any other appropriate shape providing the necessary strength to function as a trailer hitch assembly.

While a two piece cross member 12 is illustrated, it should be appreciated that the cross member 12 could be of another design such as a single continuous piece with the receiver box 18 welded beneath the cross member, above the cross member, behind the cross member or in the cross member.

The receiver box 18 includes a reinforced lip 20 defining an opening leading to a hitch bar receiving cavity 22. Aligned apertures 24 in the opposing side walls 16 of the receiver box 18 allow the secure connection of a hitch bar in the receiver box in a manner well known in the art by means of a connecting pin and cooperating pin clip (not shown). A chain plate 26 of steel material is welded to the receiver box 18 and tubular steel sections 14 in order to strengthen the connection. As is known in the art, chain plate 26 includes two apertures 28. The safety chains of a trailer may be connected to the chain plate 26 through engagement in these apertures 28.

Vehicle mounting brackets 30 are mounted adjacent the distal end of each tubular section 14. More specifically, each mounting bracket 30 includes a notch 32 sized and shaped to receive the tubular section 14. The brackets 30 are welded to the tubular sections 14 in order to complete the connection. The mounting brackets 30 each include a mounting flange 34 and an upwardly projecting mounting lug 36, both with apertures 38. Nut and bolt fasteners (not shown) are extended through these apertures 38 and cooperating apertures drilled in the frame F of the towing vehicle in order to mount the trailer hitch assembly 10 thereto.

Of course, the arrangement of the mounting flange 32 and/or mounting lug 34 will vary from hitch assembly to hitch assembly in order to correspond to the frame of the vehicle to which the hitch assembly is to be mounted. As such, the arrangement and orientation of the flanges 32 and lugs 34 in the drawing figures are to be considered illustrative in nature and not as restrictive.

As also shown in FIG. 1, the trailer hitch assembly 10 incorporates a pair of tow hooks or loops 40, one integrally formed in each mounting bracket 30. The tow hooks 40 may be engaged with a tow line such as a rope, chain or cable in order to complete certain towing applications. Still further, the trailer hitch assembly 10 includes a pair of accessory ports 50 carried on the tubular sections 14 of the central frame member 12. Each of the accessory ports 50 is formed from a steel tube that is welded to the section 14 so that one accessory port is positioned between the receiver box 18 and each mounting bracket 30. Thus, the accessory ports 50 are inboard of the mounting brackets 30 where they will not interfere with any wraparound rear quarter panel found on the vehicle. In this inboard position, they will also be spaced away from the exhaust system which on most vehicles includes a tail pipe in the rear quarter panel area.

As shown, each accessory port 50 includes a circular opening 52 and cooperating aligned apertures 54 in the sidewall thereof to allow secure connection of a trailer hitch accessory by means of a connecting pin and pin clip of a type well known in the art. Such a connecting pin and pin clip are commonly utilized to secure the hitch bar in the receiver box 18.

Each of the accessory ports 50 are oriented with respect to the central frame member 12, receiver box 18 and the towing vehicle upon which the assembly 10 is mounted so as to be readily accessible by the towing vehicle operator. More specifically, as shown in FIG. 1a, the hitch receiver box 18 has a longitudinal axis extending in a first plane A and each accessory port 50 has a longitudinal axis extending in a second plane B. The planes A and B intersect to define an included angle of approximately 10–30° and more specifically 20°.

Figure 2A:
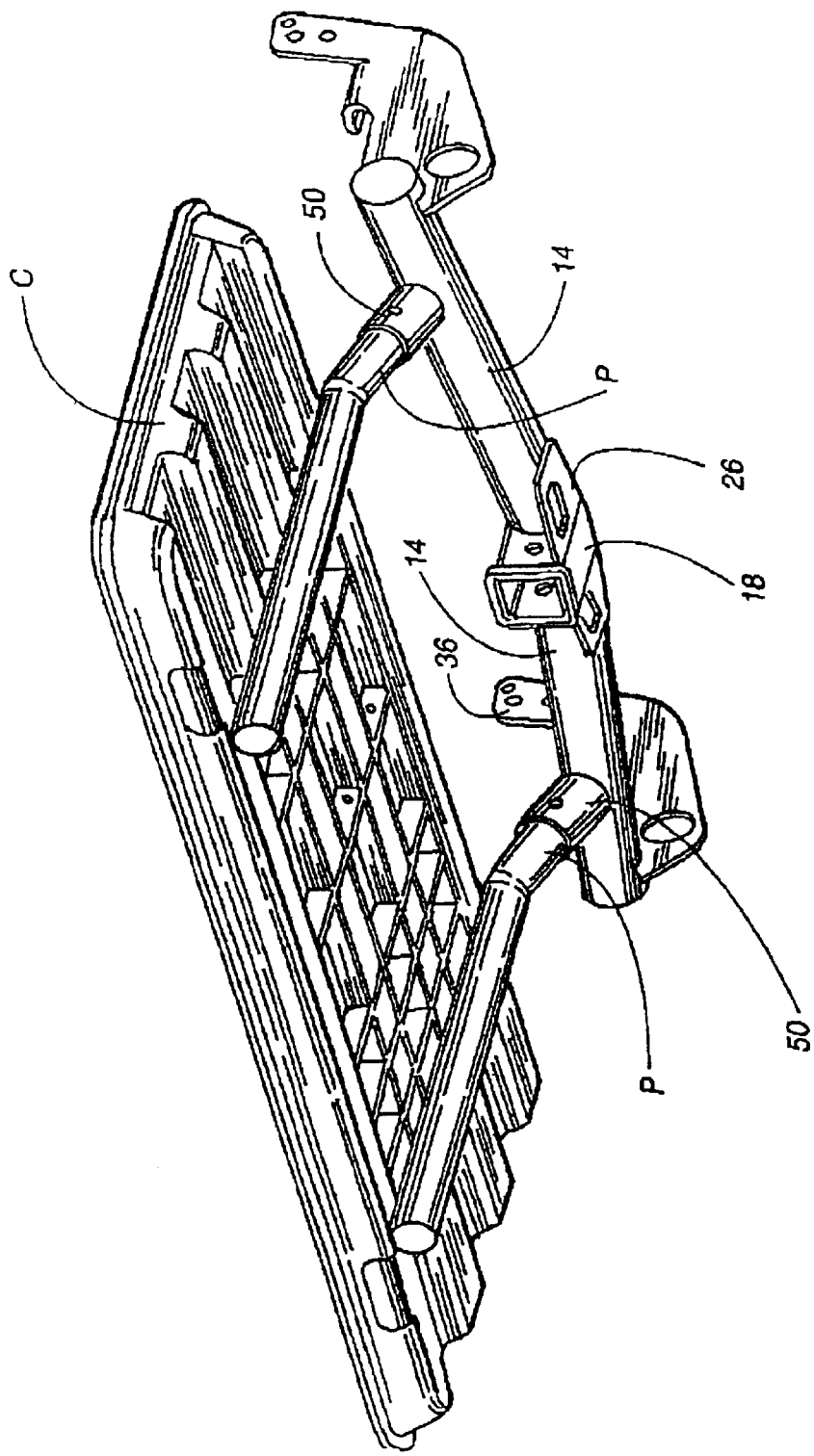
Figure 3:
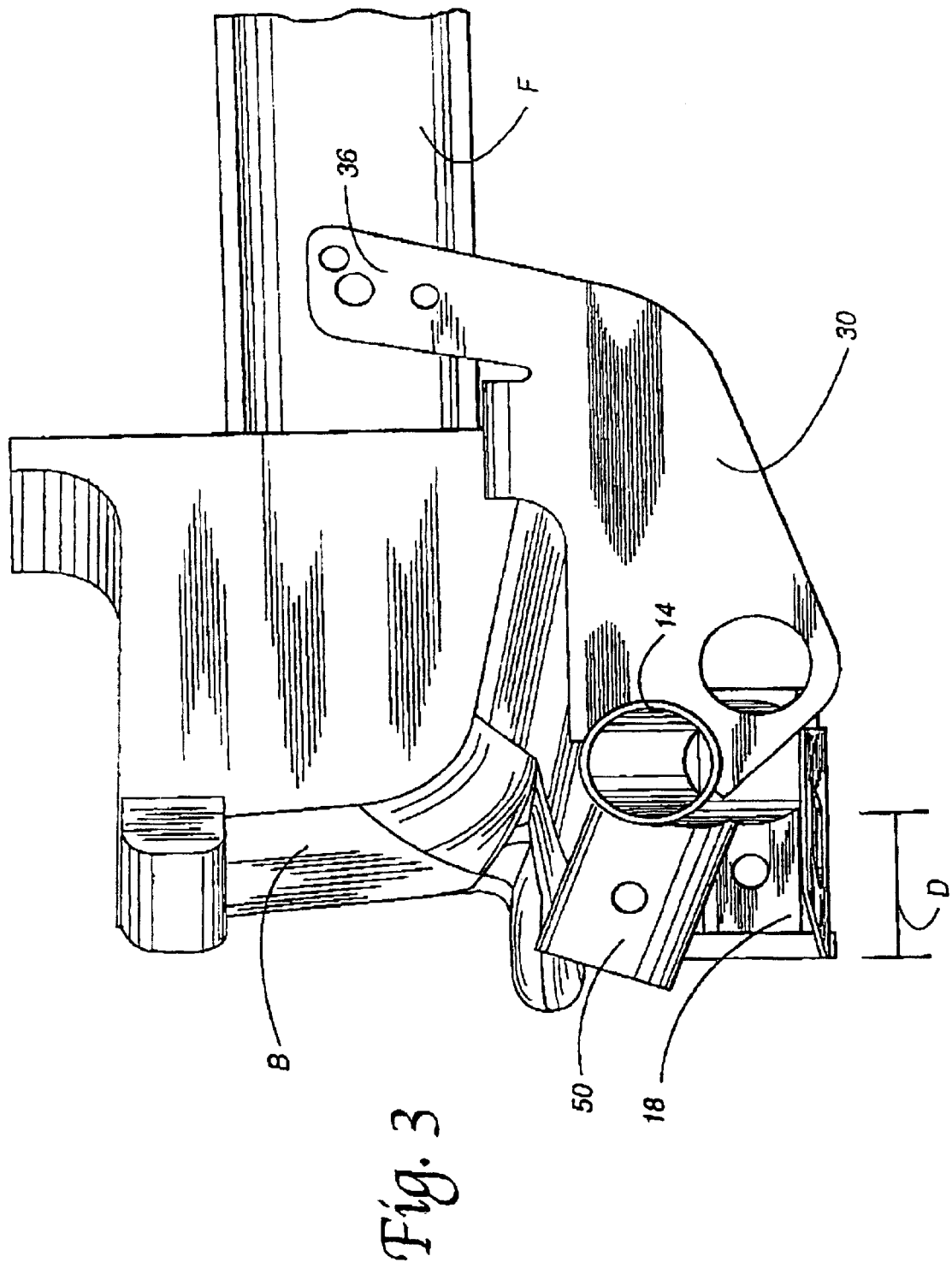
FIG. 3 is a side elevational view showing how both the hitch receiver box and accessory ports project rearwardly under the bumper of a towing vehicle to which the trailer hitch assembly is connected.

The manner in which the structural arrangement of the accessory ports benefits the user when attempting to attach a recreational and utilitarian accessory will now be more completely explained with references to FIGS. 2a, 2b and 3. As shown in FIG. 3, when the hitch assembly 10 is mounted to the Frame F of a towing vehicle, the sections 14 of the central frame member 12 are positioned directly under the bumper B of the vehicle. Both the receiver box 18 and the accessory ports 50 project rearwardly from the sections 14 a distance D so as to extend to or beyond the rearmost edge of the bumper B. Additionally, the accessory ports 50 project upwardly at a angle of 10–30° (about 20° is illustrated) with respect to the receiver box 18 and the horizontal. Thus, the circular openings 52 of the accessory ports 50 are both readily visible and accessible.

Due to this fact, it is relatively easy for the user to engage the openings 52 of the accessory ports 50 with the mounting posts P of a recreational and utilitarian accessory such as a cargo carrier platform C (see FIGS. 2a and 2b). At this point, the circular shape of the accessory ports 50 and cooperating mounting posts P further insure ease of connection. Specifically, since the posts P and ports 50 are both round, they present continuous, uninterrupted mating sidewalls. Accordingly, it is not necessary to index the posts P in any way to insure proper geometry for mating; simple alignment is all that is necessary. Additionally, the post P may be flexed slightly in virtually any direction during mating as an additional aid when making the connection.

Once properly aligned, the projecting lower lips of the two ports 50 support the weight of the accessory C and the posts P slide readily into the ports 50. When fully seated, cross apertures (not shown) in the posts P are in alignment with the apertures 54. A connecting pin (not shown) is then positioned in these apertures and a pin clip (not shown) is used to secure the pin in position. The resulting two point connection through the ports 50 dramatically increases the stability of the connection between the accessory and the vehicle. Of course, the recreational and utilitarian accessory C may be easily removed by removing the pin clips and connecting pins and pulling the posts P from the ports 50.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the hitch receiver box 18 could be used along with the ports 50 to provide a three point accessory mounting system for even greater mounting stability if desired. Still further, while two ports 50 are illustrated, additional ports could be provided if desired for a particular application.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A trailer hitch assembly for towing a trailer behind a towing vehicle, comprising:

a frame member including a hitch receiver box;

a pair of mounting brackets, one of said pair of mounting brackets carried adjacent each end of said frame member;

a pair of accessory ports carried on said frame member, each of said pair of ports projecting rearwardly from said frame member a distance D and including a circular opening for receiving a recreational and utilitarian accessory;

said trailer hitch assembly being characterized by said hitch receiver box having a first longitudinal axis extending in a first plane A and each of said accessory ports having a second longitudinal axis extending in a second plane B where said planes A and B define an included angle of approximately 10–30°.

2. The trailer hitch assembly of claim 1, wherein one of said pair of accessory ports is carried on said frame member between each of said mounting brackets and said hitch receiver box.

3. The trailer hitch assembly of claim 1, wherein said hitch receiver box has a first longitudinal axis extending in a first plane A and each of said accessory ports has a second longitudinal axis extending in a second plane B, said planes A and B defining an included angle of approximately 20°.

4. The trailer hitch assembly of claim 1, wherein said hitch receiver box projects rearwardly from said frame member a distance D like said pair of accessory ports.

5. A trailer hitch assembly for towing a trailer behind a towing vehicle, comprising:

a frame member including a hitch receiver box;

a pair of mounting brackets, one of said pair of mounting brackets carried adjacent each end of said frame member;

at least one accessory port carried on said frame member between said hitch receiver box and one of said pair of mounting brackets, said at least one accessory port projecting rearwardly and upwardly from said frame member and including a circular opening for receiving a recreational and utilitarian accessory.

* * * * *